United States Patent [19]
Collins et al.

[11] Patent Number: 5,364,169
[45] Date of Patent: Nov. 15, 1994

[54] LINEAR SAFETY BELT RETRACTOR

[75] Inventors: Cecil A. Collins, Shelby Township, Utica County; Cecil L. Champion, Madison Heights, both of Mich.

[73] Assignee: General Safety Corporation, St. Clair Shores, Mich.

[21] Appl. No.: 981,874

[22] Filed: Nov. 25, 1992

[51] Int. Cl.$^5$ ............................................. B60R 22/34
[52] U.S. Cl. ................................. 297/479; 297/467; 297/484; 297/238; 297/256.15
[58] Field of Search ............ 297/467, 476, 479, 238, 297/256.15, 484

[56] References Cited

U.S. PATENT DOCUMENTS

| | | |
|---|---|---|
| 2,963,080 | 12/1960 | Zang . |
| 3,065,027 | 11/1962 | Misslich . |
| 3,107,121 | 10/1963 | Mougey . |
| 3,174,704 | 3/1965 | Replogle .................. 297/476 X |
| 3,184,267 | 5/1965 | Rumble . |
| 3,222,107 | 12/1965 | Ferrara . |
| 3,439,933 | 4/1969 | Jantzen . |
| 3,439,952 | 4/1969 | Jantzen . |
| 3,472,552 | 10/1969 | Hopka . |
| 3,528,702 | 9/1970 | Boedigheimer . |
| 3,542,425 | 11/1970 | Pringle . |
| 3,545,788 | 12/1970 | Brawner . |
| 3,551,002 | 12/1970 | Dozois . |
| 3,558,189 | 1/1971 | Preston . |
| 3,583,763 | 6/1971 | Settimi . |
| 3,606,456 | 9/1971 | Cazabon . |
| 3,630,543 | 12/1971 | Cripps . |
| 3,645,549 | 2/1972 | Jantzen . |
| 3,667,806 | 6/1972 | Sprecher ...................... 297/479 |
| 3,915,402 | 10/1975 | Takada ...................... 297/476 X |
| 4,159,848 | 7/1979 | Manz . |
| 4,305,618 | 12/1981 | Molnar ...................... 297/476 |
| 4,655,503 | 4/1987 | Kamijo et al. .............. 297/238 |
| 4,720,148 | 1/1988 | Anthony et al. ............ 297/474 |
| 4,826,246 | 5/1989 | Meeker ...................... 297/256.15 |
| 5,224,756 | 7/1993 | Dukatz et al. ............... 297/238 |

FOREIGN PATENT DOCUMENTS 2023415  1/1980  United Kingdom .............. 297/238

Primary Examiner—Brian K. Green
Assistant Examiner—David E. Allred
Attorney, Agent, or Firm—Harness, Dickey & Pierce

[57] ABSTRACT

A linear-type belt retractor is disclosed which can be incorporated into the safety belt restraint system of a vehicular seat, auxiliary child seat or integral child seat. The linear-type belt retractor includes a stationary lock plate and a latch assembly supported for reciprocal longitudinal movement relative to the lock plate. A belt member of the safety belt restraint system is slidably secured to the latch assembly such that movement of the latch assembly in a first direction causes withdrawal of the belt member and movement in a second direction causes retraction thereof. The belt retractor also includes a biasing member for urging the latch assembly into locked engagement with the lock plate for inhibiting movement thereof in the first direction, and an actuation mechanism for selectively releasing the latch assembly for such movement.

43 Claims, 12 Drawing Sheets

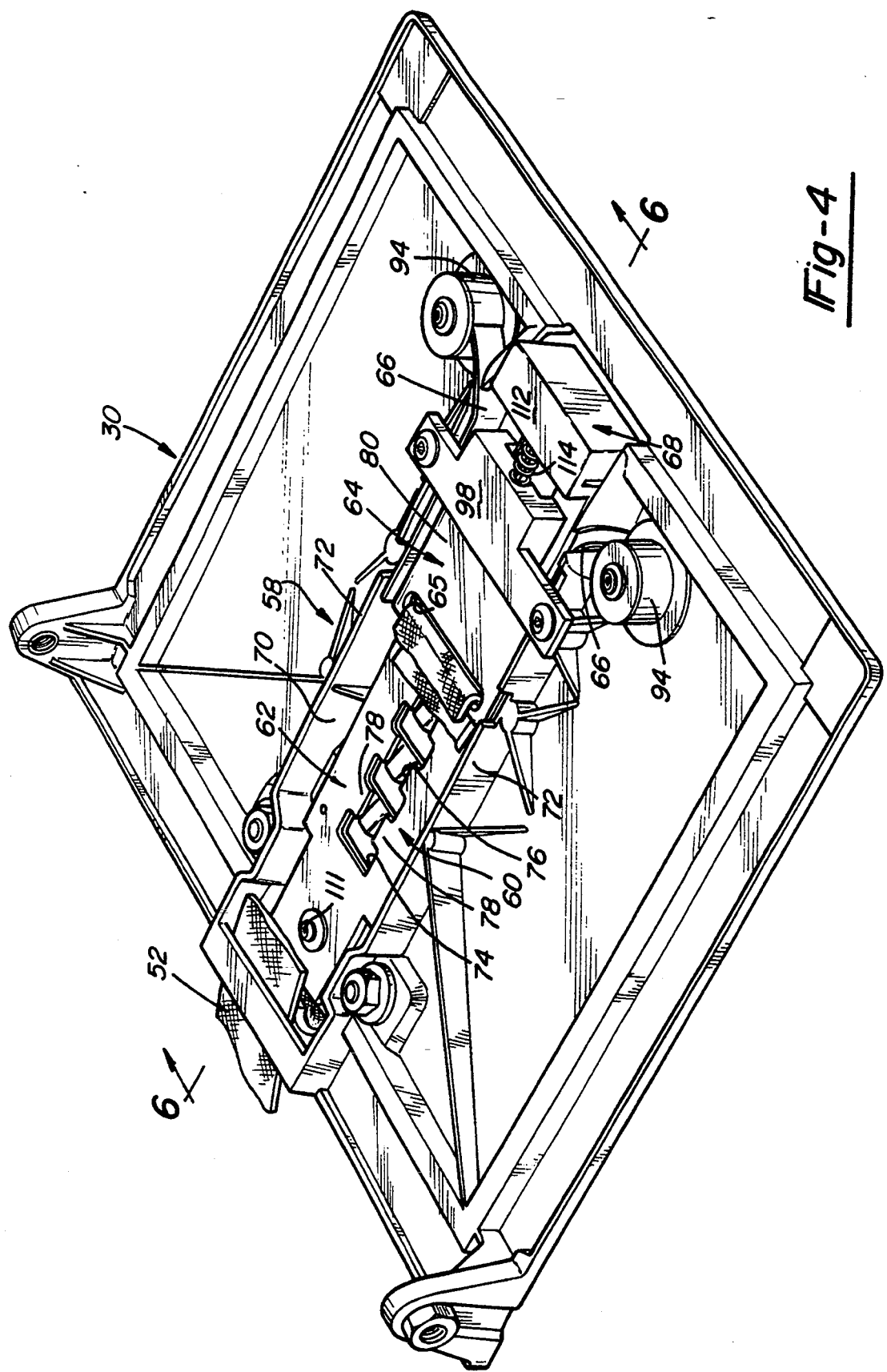

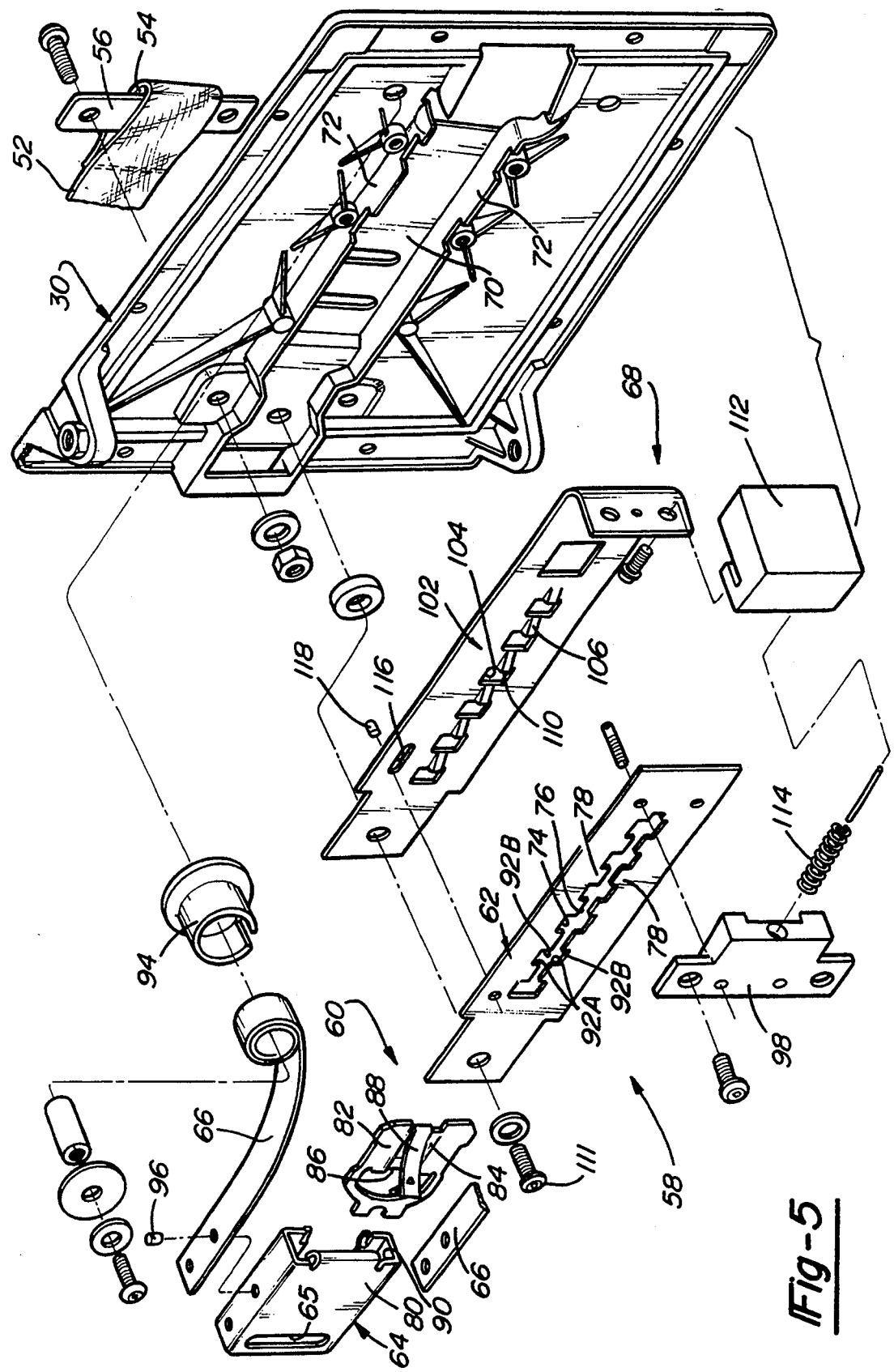

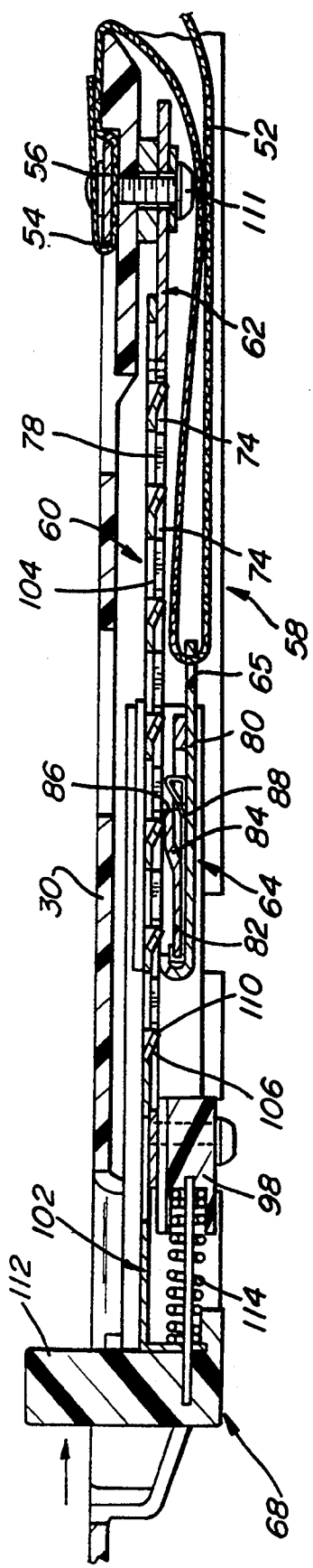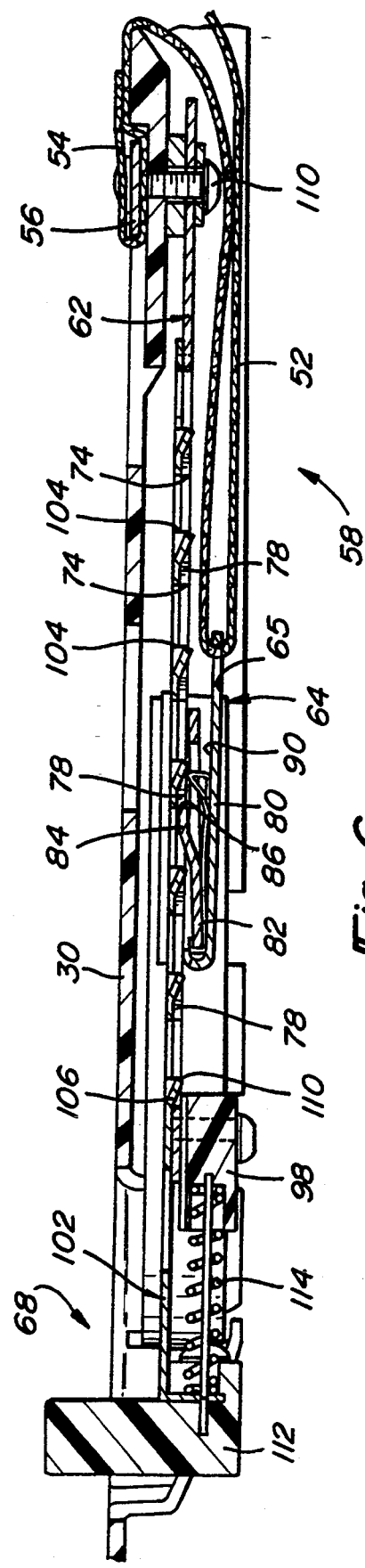

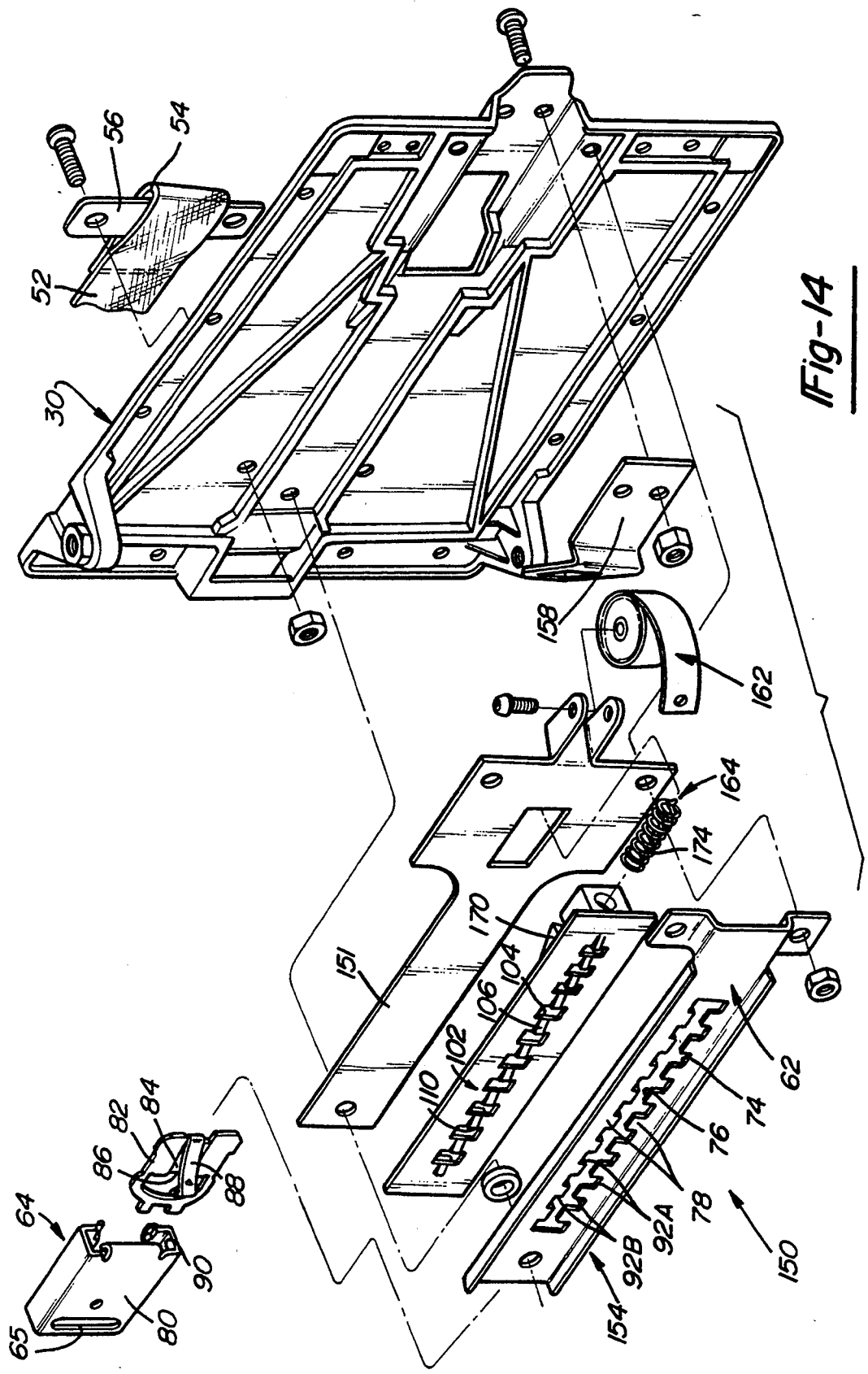

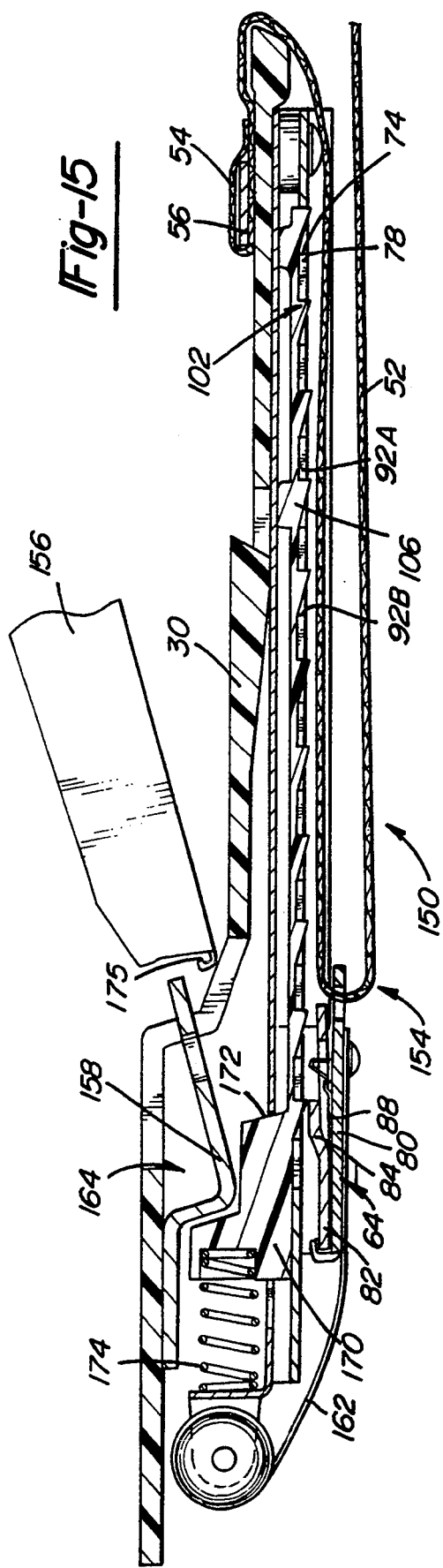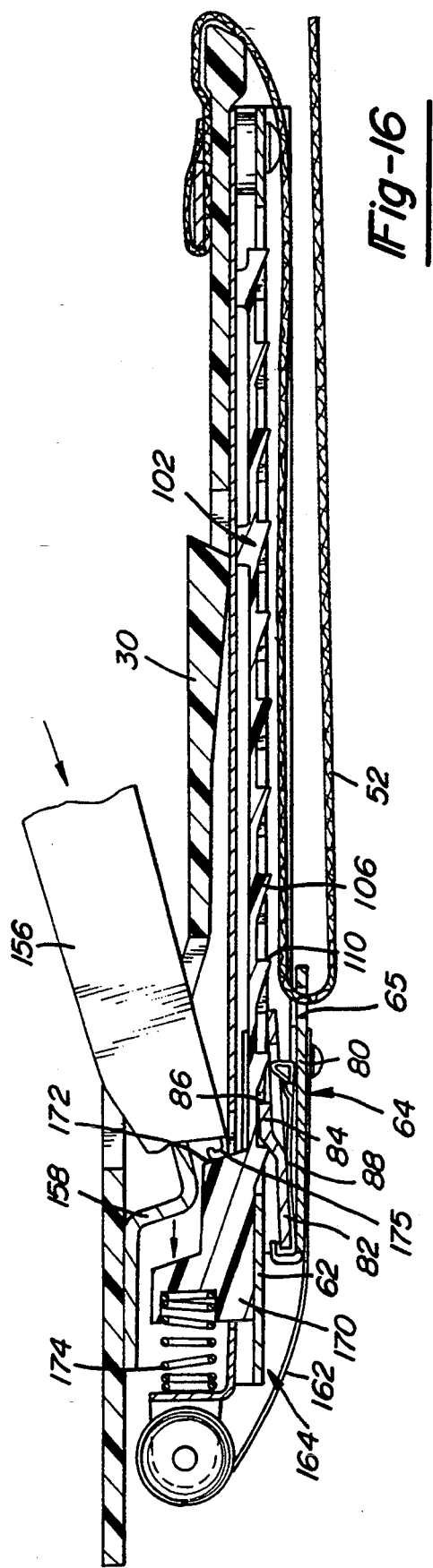

LINEAR SAFETY BELT RETRACTOR

BACKGROUND OF THE INVENTION

The present invention relates generally to passenger restraint systems and, more particularly, to safety belt retractors of the type used in vehicular seating applications.

Virtually all motor vehicles are now equipped with safety belt restraint systems for physically restraining the seat occupants when the vehicle is subjected to a high rate of deceleration which may occur, for example, during a motor vehicle collision. Traditionally, safety belt restraint systems include one of more rotary-type safety belt retractors which function to normally permit the belt webbing to be controllably withdrawn and retracted from a spring-biased spool assembly. It is also known to provide such rotary-type belt retractors with a selectively engageable locking mechanism for lockingly engaging the spool assembly in response to the occurrence of a predetermined event (i.e., latching of the belt buckle, vehicular deceleration forces above a maximum level, etc.), whereby subsequent withdrawal of belt webbing is prevented for restraining the vehicle occupant. As an additional comfort feature, some safety belt retractors are also equipped with a "tension" relief mechanism which functions to introduce a limited amount of "slack" into the belt webbing. In this manner, the spring-biased spool assembly is prevented from exerting a continuous retractive force on the belt webbing which tends to be uncomfortable and annoying to the seat occupant.

While conventional safety belt restraint systems are well-suited for restraining adult passengers, it is a common practice to use an auxiliary child seat having a belt-type harness restraint for children under a given age and weight. As is known, the child seat is placed on top of the vehicle seat and is secured thereto using the existing vehicular safety belt restraint system. It is also known to incorporate the aforementioned rotary-type belt retractor into the child seat for preventing withdrawal of the harness restraint once the child is fastened therein. An example of such a locking arrangement for an auxiliary child seat is disclosed in U.S. Pat. No. 4,720,148.

In an effort to minimize the inconvenience associated with installing and/or stowing auxiliary child seats, some motor vehicles are now available with seating arrangements having a "fold-out" or integral child seat which is incorporated into the backrest of an otherwise conventional seat. Typically, such seating arrangements are adapted to normally accommodate an adult in a seated position when the integral child seat is "concealed" within the backrest. When needed, the integral child seat can be easily deployed to expose a belt-type harness restraint that is provided for releasably retaining the child therein. To provide means for adjusting the amount of tension exerted on the child, it is known to incorporate a "tightening" mechanism into the harness restraint of the integral child seat. One commercially-available integral child seat employs a cinch-type belt tightening arrangement that can be manually-operated for adjusting the circuitous length of the harness restraint.

As an alternative to conventional cinch-type belt tightening devices, it is highly desireable to provide a "automatic" tightening mechanism which is operable to exert a retractive force on the harness restraint while preventing withdrawal thereof in response to buckling the child into the harness restraint. Such an automatic tightening mechanism offers greater convenience to the user, since no separate adjustment operations are required. Thus, it has been proposed to incorporate a conventional rotary-type belt retractor having a selectively engageable locking mechanism into an integral child seat for use as an automatic tightening mechanism. Unfortunately, in view of the need to provide comfort to adult seat occupants and preserve the overall cosmetic appearance of the seating arrangement when the integral child seat is in the concealed position, the available space for mounting such a conventional rotary-type belt retractor is severely limited.

In view of the above, the need exists to develop alternative safety belt retractors which can be efficiently packaged in a compact environment and which can be provided in either manually-operable or automatic versions.

SUMMARY OF THE INVENTION

Accordingly, the present invention is primarily directed to meeting the above objects by providing an improved construction for a safety belt retractor which can be incorporated into virtually any vehicular safety belt restraint system or child restraint system. More specifically, it is an object of the present invention to provide a linear-type belt retractor which offers significant packaging and operational advantages over conventional rotary-type retractors.

A further object of the present invention is to provide a linear-type belt retractor having an improved locking mechanism that is operable in a first mode for permitting a belt-type harness restraint to be controllably withdrawn and retracted, and in a second mode for preventing withdrawal thereof. Furthermore, the linear-type belt retractor includes actuation means for selectively shifting the locking mechanism between the first and second operative modes. According to a first embodiment, the linear-type belt retractor is operable for causing continued retraction of the harness restraint so as to exert a retractive force against the seat occupant when the locking mechanism is in the second operative mode. In an alternative embodiment, the linear-type belt retractor is operable for preventing retraction of the harness restraint when the locking mechanism is in the second operative mode, thereby providing a tension relief feature.

It is another object of the present invention to incorporate a locking mechanism into the linear-type belt retractor that is normally operable in the second operative mode and which includes manually-operable actuation means for permitting the user to selectively shift the locking mechanism into the second operative mode.

A still further object of the present invention is to incorporate a locking mechanism into a linear-type belt retractor that is normally operable in the first operative mode and which includes means for automatically shifting the locking mechanism into the second operative mode in response to fastening of the harness restraint.

Accordingly, the linear-type belt retractor of the present invention includes a stationary lock plate and latch means supported for reciprocal longitudinal movement relative to the lock plate. A belt member of a safety belt restraint is slidably secured to the latch means such that linear movement of the latch means in a first direction causes withdrawal of the restraint and linear movement in a second direction causes retraction thereof. The belt retractor further includes biasing means for urging the latch means into locked engagement with the lock plate for inhibiting linear movement thereof in the first direction, and actuation means for selectively releasing the latch means for reciprocal rectilinear movement.

Additional objects, features and advantages of the present invention will become apparent to those skilled in the art from studying the written description and appended claims, taken in conjunction with the accompanying drawings.

BRIEF DESCRIPTION OF THE DRAWINGS

FIG. 4 is a bottom view of the seat portion shown in FIG. 3 for illustrating the linear-type belt retractor in greater detail;

FIG. 5 is an exploded perspective view of FIG. 4 showing the latching and release components associated with the manually-operable linear-type belt retractor of the present invention;

FIG. 6 is an enlarged longitudinal section view, taken along line A—A of FIG. 4, showing the linear-type belt retractor operating in a "locked" mode for inhibiting withdrawal of the harness restraint;

FIG. 7 is similar to FIG. 6, only showing the linear-type belt retractor operating in a "released" mode for permitting the harness restraint to be controllably withdrawn and retracted;

FIG. 14 is an exploded perspective view of FIG. 13 showing the latching and release components associated with the automatic linear-type belt retractor of the present invention;

FIG. 15 is an enlarged longitudinal section view, taken along line B—B of FIG. 13, showing the automatic linear-type belt retractor operating in a "released" mode when the harness restraint is unbuckled for allowing retraction and withdrawal thereof;

FIG. 16 is a view, similar to FIG. 15, showing the automatic linear-type belt retractor operating in a "locked" mode for inhibiting subsequent withdrawal of the harness restraint in response to buckling thereof;

DETAILED DESCRIPTION OF THE INVENTION

In general, the present invention is directed to an improved safety belt retractor which can be incorporated into vehicular safety belt restraint systems and child restraint systems (i.e., auxiliary child seats or integral child seats). More particularly, the present invention discloses several embodiments of a linear-type belt retractor which offer significant packaging and operational advantages over conventional rotary-type belt retractors. Thus, it is to be understood that while various preferred embodiments of the linear-type belt retractor are hereinafter disclosed in association with one or more particular seating arrangements, such seating arrangements are merely exemplary representations of the type of environment to which the present invention is readily applicable.

Figure 1:
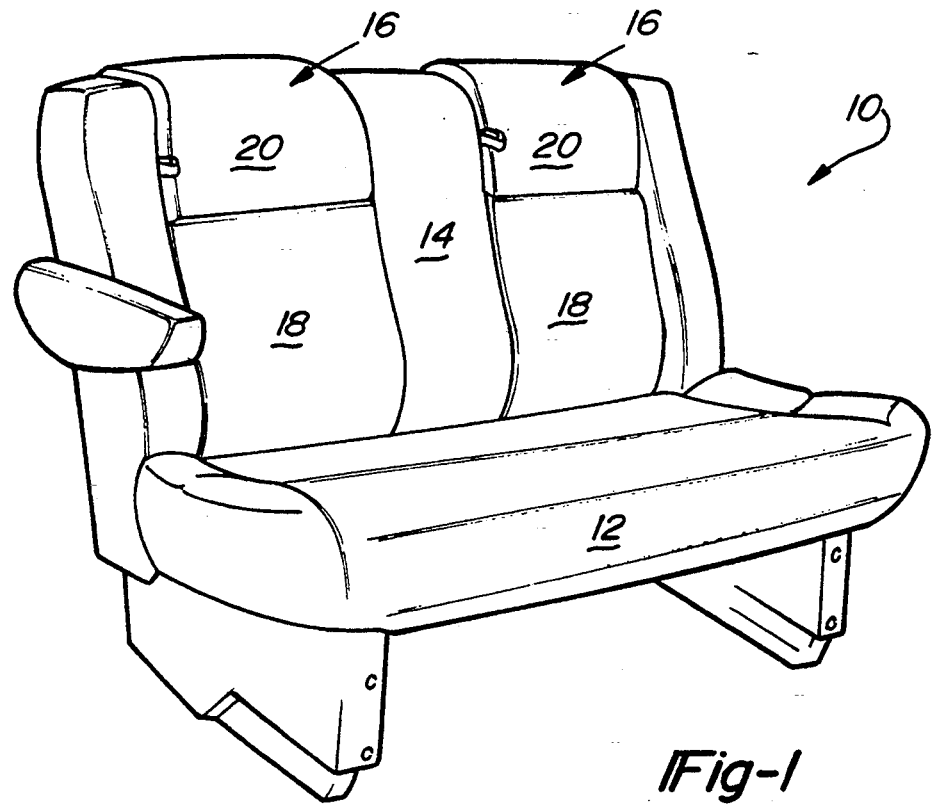
FIG. 1 is a perspective view of an exemplary vehicular seat having an integral child seat shown in a "concealed" position.
Figure 2:
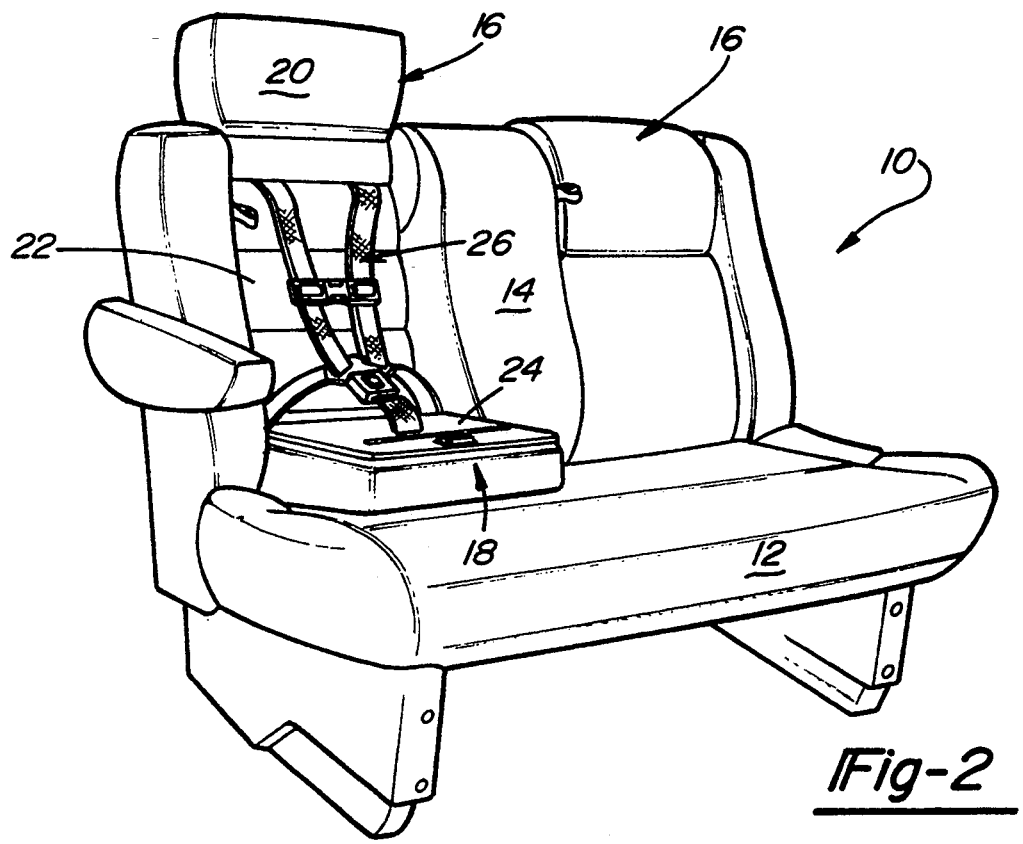
FIG. 2 is a perspective view of the vehicular seat shown in FIG. 1 with the integral child seat deployed to an "open" position.

Referring now to the drawings, and particularly FIGS. 1 and 2, an exemplary bench seat 10 of the type used in motor vehicles is shown. Bench seat 10 has a seat cushion 12, a backrest 14, and a pair of integral child seats 16 incorporated into backrest 14. Integral child seats 16 each include a fold-down seat member 18 and a fold-up head support 20. As shown in FIG. 1, bench seat 10 is in a normal adult seating position with integral child seats 16 in a "concealed" position. As illustrated in FIG. 2, when an integral child seat 16 is deployed to its fully "open" position, a cushioned back pad 22, a cushioned seat pad 24 and a safety belt restraint system, shown as a five-point belt-type harness restraint 26, are exposed.

Figure 3:
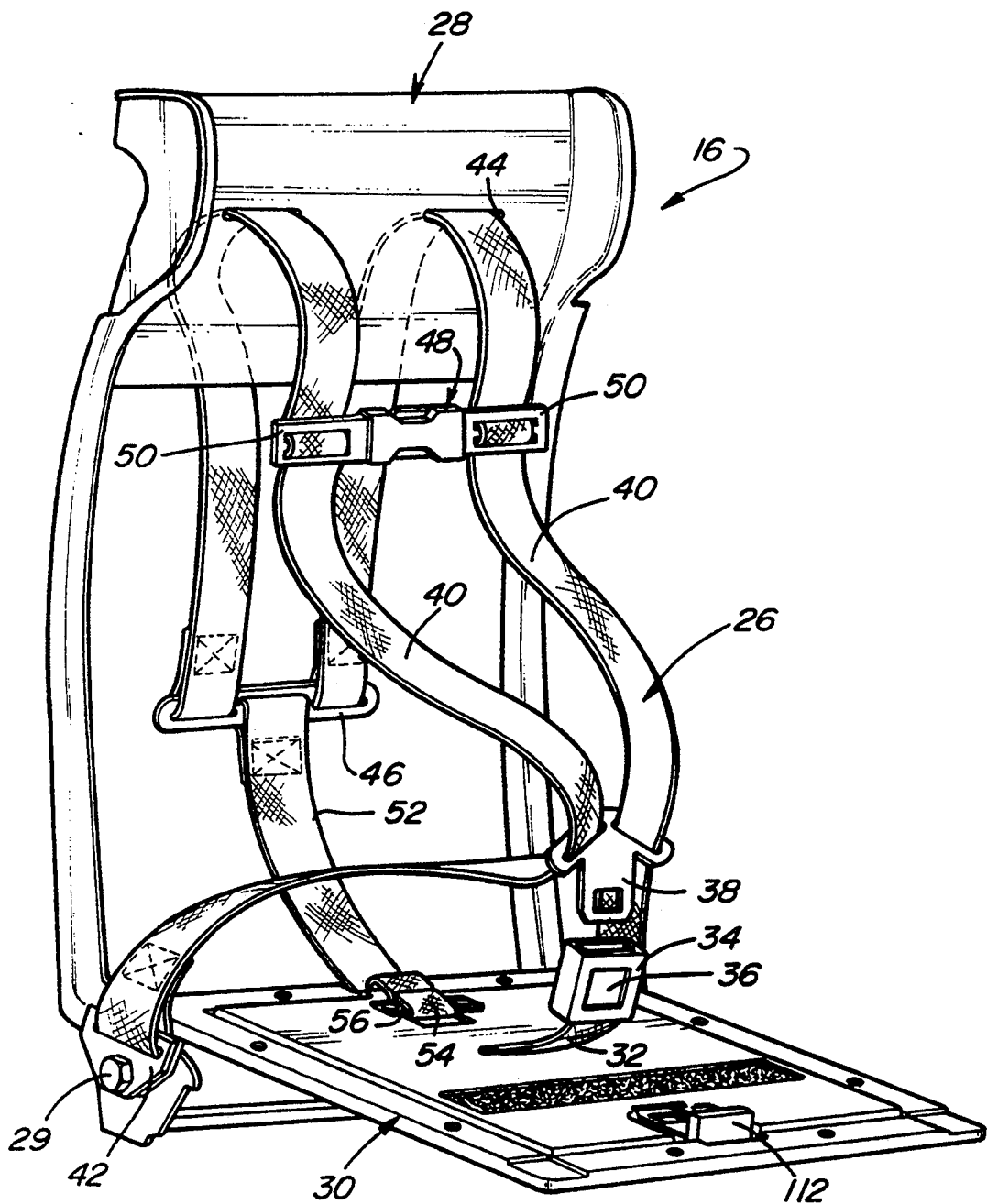
FIG. 3 is a perspective view of the underlying frame structure and belt-type harness restraint associated with the integral child seat and which is equipped with a manually-operable linear-type belt retractor constructed according to a preferred embodiment of the present invention.

With particular reference now to FIGS. 3 and 4, integral child seat 16 is shown in the "open" position with its upholstery and padding removed (i.e., cushioned back pad 22 and seat pad 24) to more clearly illustrate the present invention. More specifically, integral child seat 16 is shown to include a rigid seatback member 28 and a rigid seat pan 30 that is coupled to seatback member 28 for pivotable movement about pivot points 29. Harness restraint 26 is shown to include a crotch belt 32 having a first end anchored to seat pan 30 and a second end having a second fastener or seat belt buckle 34 secured thereto. Belt buckle 34 includes a spring-biased push button 36 for allowing the user to selectively release a first fastener or tongue plate 38 which, in turn, is slidably supported from a pair of combination lap/shoulder straps, hereinafter referred to as safety belts 40. A first end of each safety belt 40 is anchored to seat pan 30 at pivot points 29 via anchor plates 42. The opposite end of each safety belt 40 extends through a slot 44 in seatback member 28 and is connected to an elongated connector bar 46. To provide means for retaining a child within safety belts 40, harness restraint 26 also includes a slidable latching arrangement 48 having a pair of releasably engageable harness clips 50. As will be appreciated, the above-described underlying frame structure and harness restraint 26 for integral child seats 16 are conventional in construction and merely exemplary of a specific environment for which the present invention is applicable.

With continued reference to the drawings, a tension belt 52 is shown having one end coupled to connector bar 46 and its opposite end coupled to a rearward portion of seat pan 30. More particularly, a loop 54 formed at the second end of tension belt 52 is retained on a mounting plate 56 which is fixed to seat pan 30. According to a first embodiment of the present invention, a linear-type belt retractor 58 is mounted to an underside surface of seat pan 30. In general, linear-type belt retractor 58 is operable for selectively adjusting the "effective" length of tension belt 52 which, in turn, causes a corresponding extension or retraction of safety belts 40 with respect to a child seated in integral child seat 16. More specifically, linear-type belt retractor 58 includes a locking mechanism 60 having an elongated first member or lock plate 62 fixed to seat pan 30 and a latch assembly 64 that is retained for selective reciprocal longitudinal movement on lock plate 62. An intermediate portion of tension belt 52 is "doubled-back" on itself and slidably retained on latch assembly 64 via slot 65 such that reciprocal longitudinal movement of latch assembly 64 results in a corresponding increase or decrease (i.e., depending on the direction of travel of latch assembly 64 on lock plate 62) in the effective length of tension belt 52. Thus, linear movement of latch assembly 64 in a first direction (i.e., toward the rear edge of seat pan 30) permits safety belts 40 to be withdrawn from integral child seat 16. Likewise, linear movement of latch assembly 64 in an opposite second direction acts to retract safety belts 40 into integral child seat 16. As a related feature, since tension belt 52 is "doubled-back" on itself due to its slidable connection to latch assembly 64, a predetermined amount of linear movement of latch assembly 64 results in a change in the effective length of tension belt 52 that has a magnitude equal to twice the predetermined amount. This feature is desireable in that it contributes to the overall compact nature of linear-type belt retractor 58.

According to the particular embodiment shown, locking mechanism 60 is arranged to normally operate in a "locked" mode for inhibiting movement of latch assembly 64 in the first direction and, in turn. inhibiting withdrawal of safety belts 40. However, locking mechanism 60 is adapted to permit movement of latch assembly 64 in the second direction when operating in the "locked" mode. Biasing means, shown as a pair of coiled rewind springs 66 having a first end retained on seat pan 30 and a second end attached to latch assembly 64, are provided for normally urging latch assembly 64 in the second direction for exerting a retractive force on safety belts 40. Linear-type belt retractor 58 further includes a manually-operable actuation mechanism 68 that can be selectively actuated for placing locking mechanism 60 in a "released" mode, whereby latch assembly 64 is linearly movable in both of the first and second directions.

Turning to FIGS. 4 through 7, the specific construction of linear-type belt retractor 58 will now be described in greater detail. From FIG. 4, it can be seen that linear-type belt retractor 58 is mounted in a compact arrangement within a longitudinal chamber 70 defined between a pair of laterally-spaced transverse flanges 72 that are formed on the underside surface of seat pan 30. In addition, lock plate 62 is shown fixed to seat pan 30 within chamber 70 and as having a series of equally-spaced and longitudinally aligned locking apertures 74 formed therein. Lock plate 62 also includes an elongated longitudinal slot 76 formed between adjacent locking apertures 74 which cooperates therewith for defining opposed sets of inwardly-facing teeth 78 that have a generally rectangular profile. As previously noted, latch assembly 64 is retained for selective reciprocal longitudinal movement with respect to lock plate 62. More particularly, latch assembly 64 includes a second member or slide bracket 80 that is slidably mounted on lock plate 62 and a spring-biased latch member 82 that is retained within slide bracket 80 and is positioned below and adjacent to lock plate 62. In addition, a longitudinally-extending projection 84 is formed on the main body of latch member 82 and is adapted to be aligned with locking apertures 74 and elongated slot 76 on lock plate 62. However, projection 84 has a width dimension that is greater than the width of elongated slot 76, but less than the width of locking apertures 74. Moreover, projection 84 is tapered or "ramped" upwardly toward lock plate 62 and terminates in a rear latch face 86. A first biasing member, such as leaf spring 88, is positioned between latch member 82 and a planar segment 90 of slide bracket 80 for normally biasing latch member 82 toward lock plate 62. Thus, projection 84 is normally biased by leaf spring 88 into a locking aperture 74 such that any attempt to withdraw safety belts 40 causes rear latch face 86 of projection 84 to lockingly engage a first set of tooth edges 92A which define the rearward transverse edge of such locking aperture 74. In this position, locking mechanism 60 is in the "locked" mode such that latch assembly 64 is locked against linear movement in the first direction for inhibiting extension of tension belt 52 and, in turn, extension of safety belts 40.

As a feature of the present invention, linear-type belt retractor 58 is also operable to permit movement of latch assembly 64 in the second direction when locking mechanism is in the "locked" mode, thereby permitting rewind springs 66 to exert a continuous retractive force on safety belts 40. As can be seen, a coiled portion of rewind springs 66 is retained within a spring retainer 94 that is fixed to seat pan 30. In addition, the free end of rewind springs 66 are shown fixed via fasteners 96 to opposite lateral edges of slide bracket 80. Accordingly, movement of latch assembly 64 in the second direction causes tapered projection 84 to engage a second set of tooth edges 92B which define the forward transverse edge of locking aperture 74. The tapered profile of projection 84 is adapted to permit rewind springs 66 to forcibly urge latch member 82 to cam or "ride over" tooth edges 92B for releasing projection 84 from locking aperture 74. Thereafter, latch member 82 will ride over an adjacent pair of teeth 78 until projection 84 is again biased into the next locking aperture 74. Thus, latch assembly 64 can move in the second direction by sequentially "ratcheting" into and out of adjacent locking apertures 74 for retracting tension belt 52 and, in turn, safety belts 40. As will be appreciated, such ratcheting action will continue until safety belts 40 are "taut" against the child and projection 84 is again biased into and retained within another of locking apertures 74 in lock plate 62. Alternatively, without a child seated in integral child seat 16, rewind springs 66 will cause latch assembly 64 to move (i.e., sequentially ratchet) in the second direction for retracting safety belts 40 until slide bracket 80 abuts a transverse blocking plate 98 that is secured between flanges 72 so as to define a forward stop position, whereat the minimum effective length of tension belt 52 is established.

Manually-operable actuation mechanism 68 can be selectively actuated for shifting locking mechanism 60 from the "locked" mode into the "released" mode for permitting reciprocal linear movement of latch assembly 64. In general, such selective actuation of actuation mechanism 68 functions to release projection 84 of latch member 82 from locked engagement with a particular locking aperture 74 for permitting linear movement of latch assembly 64 in the first direction. To this end, means are provided for selectively depressing latch member 82 in opposition to leaf spring 88 for maintaining latch face 86 of projection 84 in a position displaced from tooth edges 92A of locking apertures 74, thereby defining the "released" mode. According to the embodiment shown, actuation mechanism 68 includes an elongated third member or release plate 102 that is supported for longitudinal sliding movement between a "non-actuated" position (FIG. 6) and an "actuated" position (FIG. 7). Release plate 102 includes a series of equally-spaced apertures 104 and longitudinal cam projections 106 that are formed between adjacent apertures 104. Moreover, cam projections 106 are rearwardly and downwardly tapered and have a width dimension permitting rectilinear movement thereof within locking apertures 74 and elongated slot 76 of lock plate 62. In addition, the lowermost rearward edge 110 of cam projections 106 is adapted to extend slightly below the planar lower surface of teeth 78. In the "non-actuated" position, locking mechanism 60 is in the "locked" mode for inhibiting linear movement of latch assembly in the first direction. More specifically, when release plate 102 is in the "non-actuated" position, apertures 104 are aligned with locking apertures 74, and cam projections 106 are positioned within elongated slot 76 between teeth 78. As such, retractive movement of latch assembly 64 in the second direction causes projection 84 to engage cam projections 106 for permitting latch member 82 to "ratchet" over teeth 78 in the manner previously described.

With particular reference to FIG. 7, release plate 102 is shown moved to the "actuated" position for shifting locking mechanism 60 into the "released" mode. Such movement of release plate 102 causes cam projections 106 to enter into locking apertures 74 for forcibly depressing projection 84 on latch member 82 in opposition to spring member 88. Since the tapered rearward edge 110 of cam projections 106 extends below the plane of teeth 78, rear latch face 86 of projection 84 is biasingly displaced to a position where it is no longer engageable with the first set of tooth edges 92A for releasing latch member 82 from locked engagement with lock plate 62, thereby permitting sliding longitudinal movement of latch member 82 and, in turn, latch assembly 64 in the first direction. As noted, such linear movement of latch assembly 64 in the first direction cause an increase in the effective length of tension belt 52 which permits a corresponding withdrawal of safety belts 40. Upon continued withdrawal of safety belts 40, latch assembly 64 eventually engages a fixed member located at the rear of lock plate 62, shown as fastener 111, for defining a rear stop position which establishes the maximum effective length of tension belt 52.

To provide means for permitting selective movement of release plate 102 between the "non-actuated" and "actuated" positions, actuation mechanism 68 includes a spring-biased operator 112 that is fixed to release plate 102. In addition, operator 112 extends upwardly through an opening in seat pan 30 to provide convenient access thereto. A second biasing member, shown as coil spring 114, is operably disposed between operator 112 and a stationary surface, such as blocking plate 98, for normally biasing operator 112 and release plate 102 toward the "non-actuated" position of FIG. 6. In operation, the user must move operator 112, in opposition to the biasing of coil spring 114, for shifting release plate 102 to the "actuated" position, thereby releasing latch assembly 64 for linear movement on lock plate 62 in the first direction. Upon release of operator 112, coil spring 114 urges release plate 102 to return to the "non-actuated" position. Thus, actuation mechanism 68 can be selectively actuated in a manner that is independent of the buckled relationship between belt buckle 34 and tongue plates 38. Finally, a lost-motion guide slot 116 is formed in release plate 102 which receives a pin I 18 that is fixed to lock plate 62. As such, engagement of pin 118 with the opposite ends of guide slot 116 in response to sliding movement of release plate 102 acts to positively delineate the "non-actuated" and "actuated" positions of release plate 102.

Figure 8:
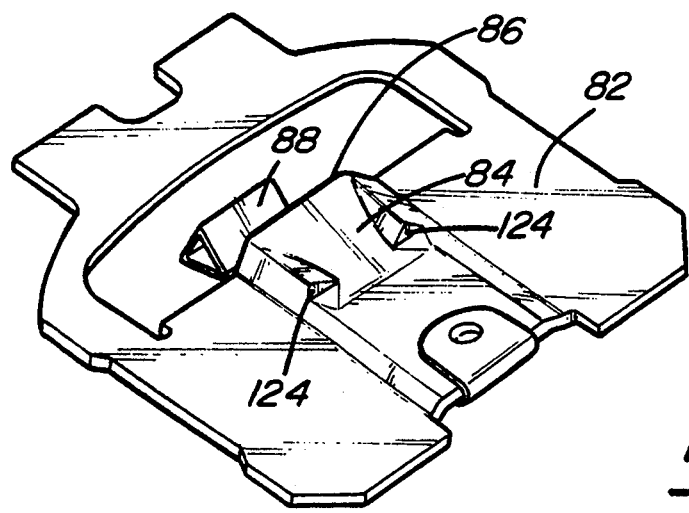
FIG. 8 is an enlarged perspective view of a latching component associated with an alternative embodiment of the manually-operable linear-type belt retractor which is operable to provide a tension relief feature.
Figure 9:
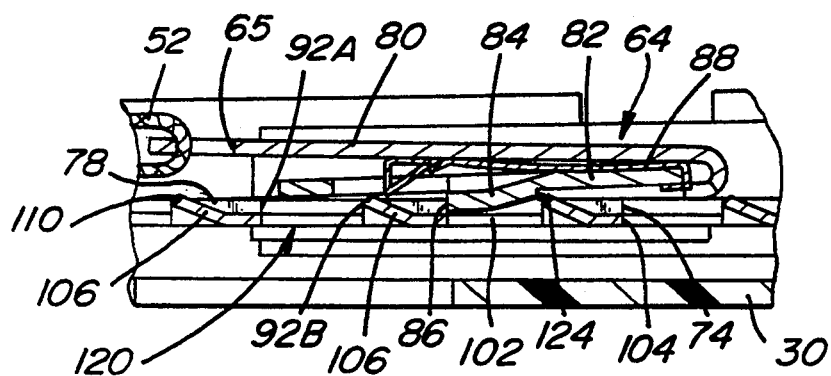
FIG. 9 is a partial sectional view of a linear-type belt retractor having the latch component of FIG. 8 incorporated therein.
Figure 11:
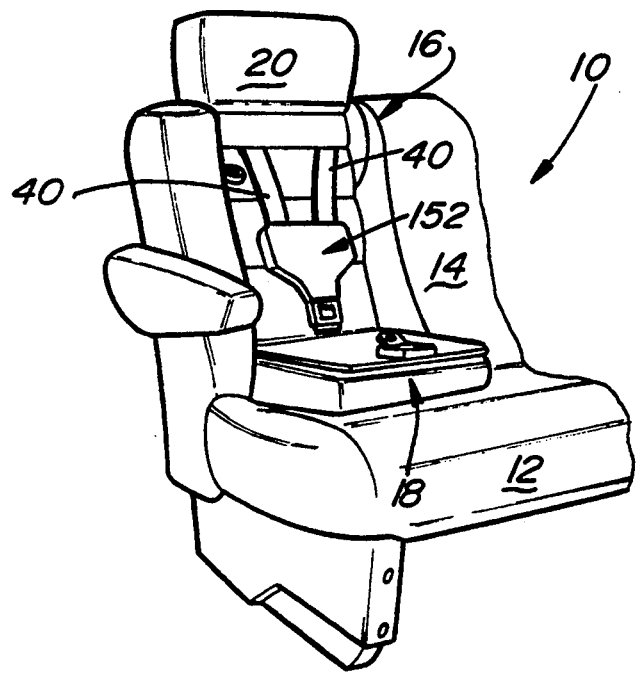
FIG. 11 is a perspective view showing an integral child seat equipped with an automatic linear-type belt retractor that is constructed according to yet another preferred embodiment of the present invention.

With particular reference now to FIGS. 8 and 9, an alternative construction is shown for a locking mechanism 120 that is adapted for use in linear-type belt retractor 58. In general, locking mechanism 120 is identical to locking mechanism 60 with the exception that latch member 82 has been modified to also inhibit movement of latch assembly 64 in the second direction when operating in the "locked" mode. In this manner, locking mechanism 120 provides a tension relief feature for inhibiting rewind springs 66 from exerting a continuous retractive force on safety belts 40. Due to the significant commonality of components, like reference numbers are used hereinafter to designate identical or substantially similar components previously described in reference to linear-type belt retractor 58. Latch member 82 is shown to include projection 84 having rear latch face 86 for lockingly engaging the first set of tooth edges 92A within a locking aperture 74 for inhibiting linear movement of latch assembly 64 in the first direction when locking mechanism 120 is in the "locked" mode. In addition, projection 84 has been modified to include a front latch face 124 that is adapted to lockingly engage the second set of tooth edges 92B within such locking aperture 74 for also inhibiting linear movement of latch assembly 64 in the second direction when locking mechanism 120 is in the "locked" mode. Since movement of latch assembly 64 in the second direction is inhibited, rewind springs 66 are prevented from exerting a retractive force against the seat occupant. When it is desired to adjust the tension exerted on the child by harness restraint 26, operator 112 must be moved by the user for moving release plate 102 to the "actuated" position, thereby releasing spring-biased latch member 82 for sequential ratcheting movement over locking apertures 74 in either direction. As will be appreciated, selective movement of release plate 102 to the "actuated" position is operable for forcibly displacing spring-biased latch member 82 away from lock plate 64 to release both rear latch face 86 and front latch face 124 of projection 84 from engagement with a locking aperture 74.

Figure 10:
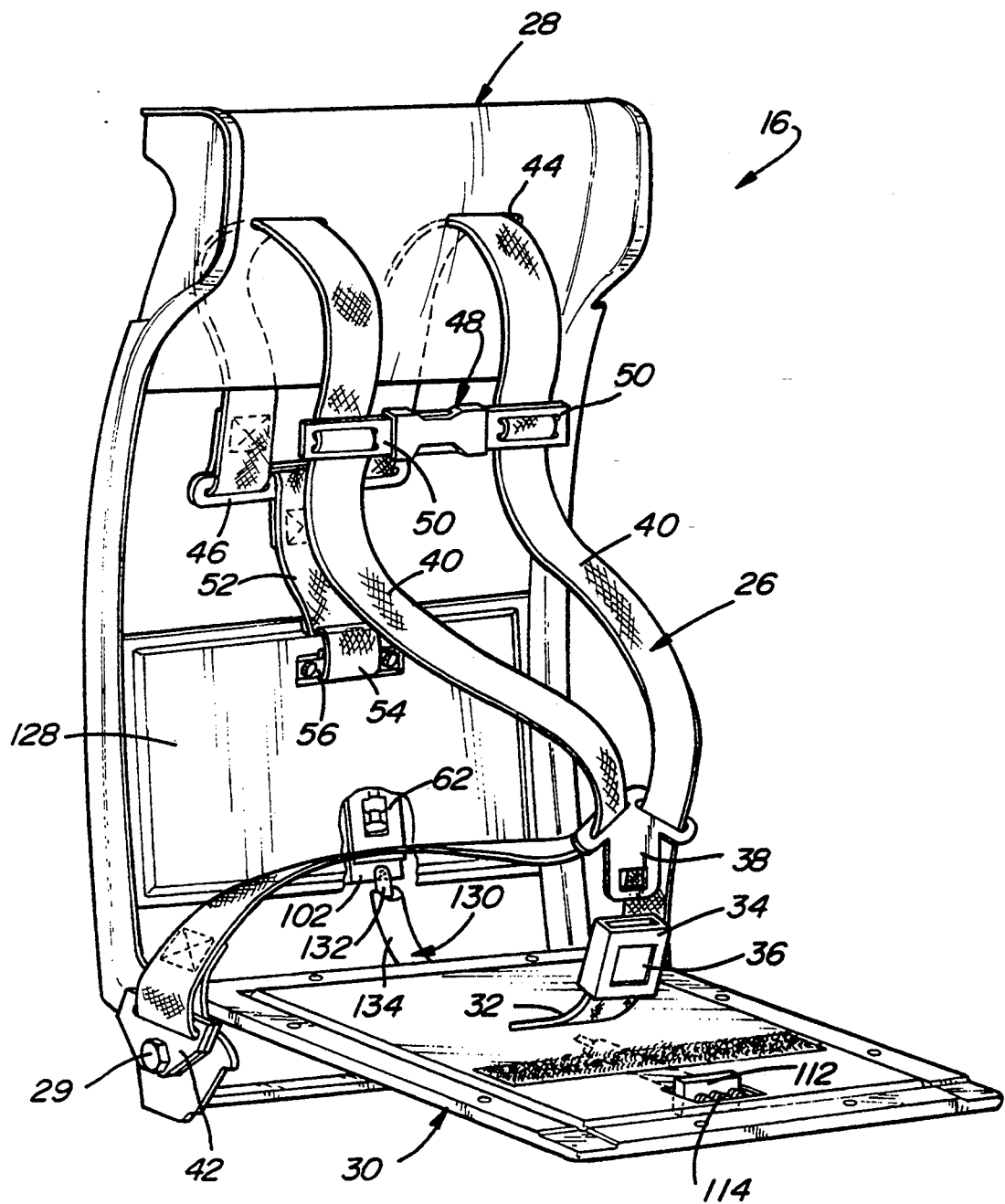
FIG. 10 is a perspective view, similar to FIG. 3 showing the manually-operable linear-type belt retractor operably installed with a seatback portion of the integral child seat.
Figure 12:
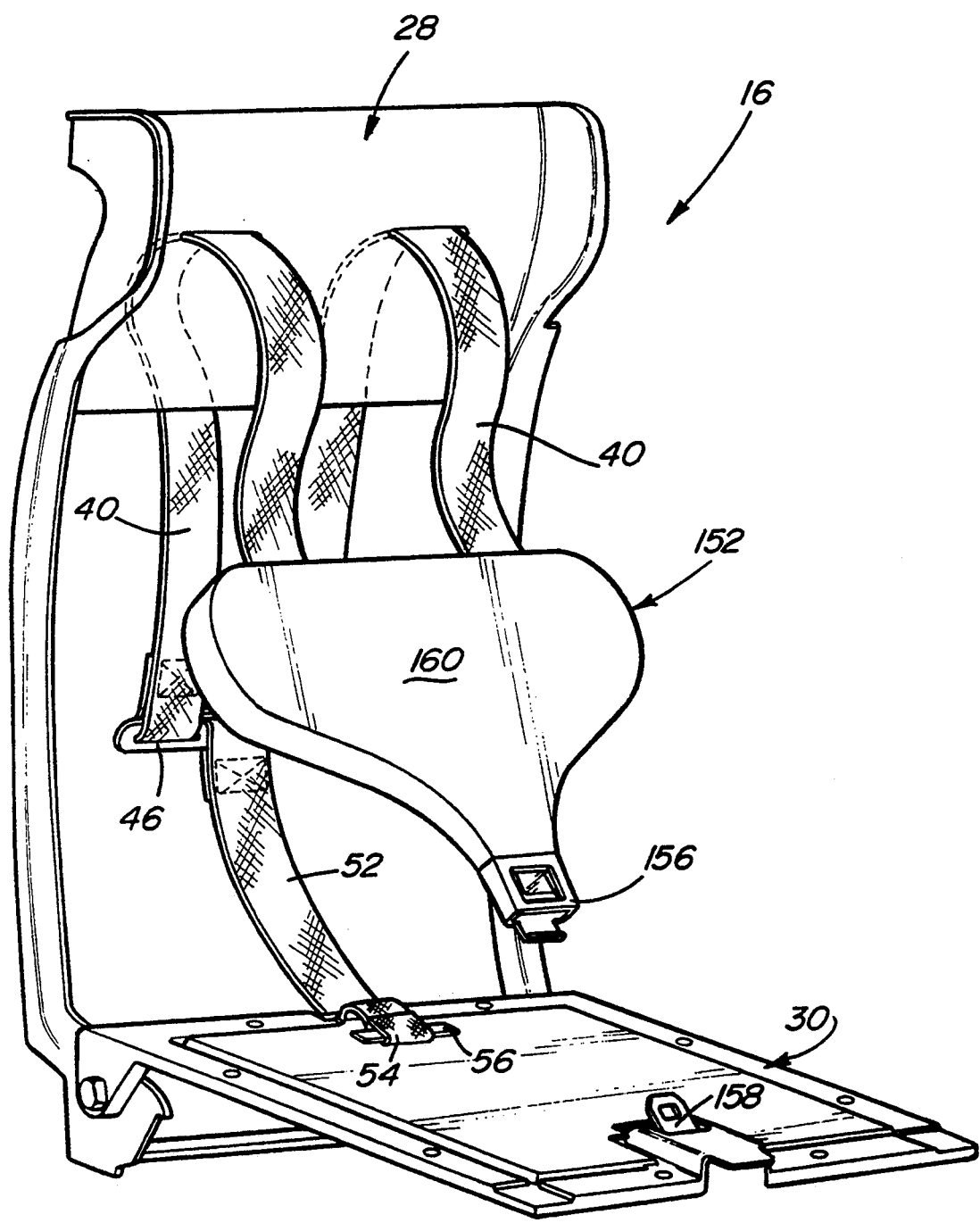
FIG. 12 is a perspective view of the underlying frame structure and belt-type harness restraint associated with the integral child seat showing the automatic linear-type belt retractor operably installed in the seat portion thereof.
Figure 13:
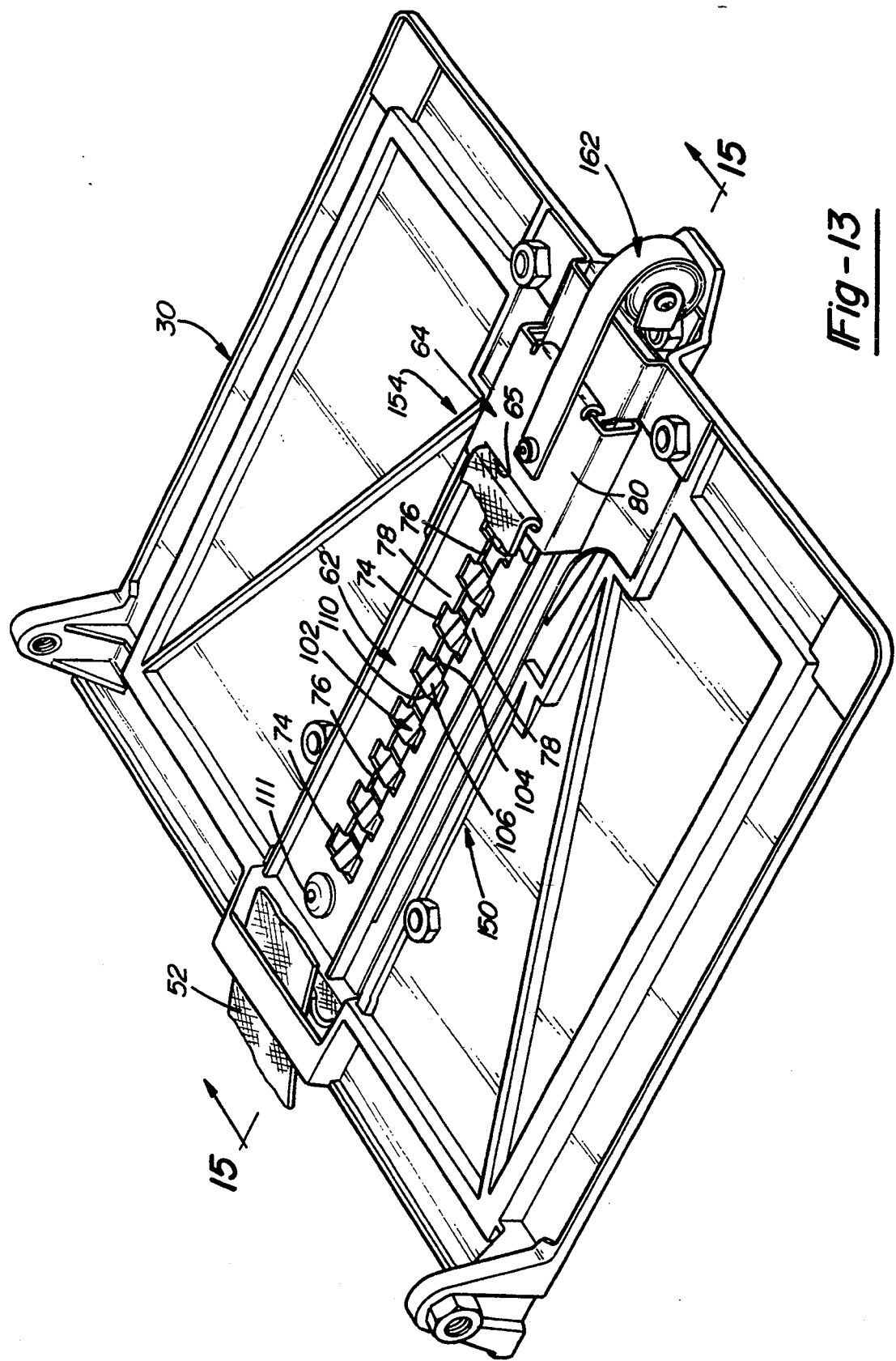
FIG. 13 is a bottom view of the seat portion in FIG. 12 showing the automatic linear-type belt retractor in greater detail.

Turning now to FIG. 10, linear-type belt retractor 58 is shown operably installed within seatback member 28 of integral child seat 16. In general, linear-type belt retractor 58 can be secured directly to seatback member 28 or, alternatively, to a mounting support 128 that is subsequently attached to seatback member 28. In addition, linear-type belt retractor 58 can be equipped with either of locking mechanism 60 or tension relieving locking mechanism 120. According to the arrangement shown, a remote actuation device, shown as a bowden cable assembly 130, is operably installed between operator 112 and release plate 102 for causing movement of release plate 102 between the "non-actuated" and "actuated" positions in response to movement of operator 112. More particularly, an axially movable inner cable 132, housed within an outer sheath 134, has a first end coupled to release plate 102 and a second end coupled to operator 112. As previously noted, operator 112 is normally urged by one or more springs 114 to a position wherein release plate 102 is maintained in the "non-actuated" position. As such, selective movement of operator 112 in opposition to the biasing of such springs 114 causes axial movement of inner cable 132 for concurrently moving release plate 102 to the "actuated" position. Thus, it can be seen that linear-type belt retractor 58 is well-suited for compact arrangement in either of seat pan 30 or seatback member 28 of integral child seat 16.

FIGS. 11 through 16 are provided for illustrating yet another embodiment of a linear-type belt retractor 150 that can be incorporated into virtually any safety belt restraint system. Again, for purposes of illustration only, belt retractor 150 is shown incorporated into integral child seat 16. Moreover, linear-type belt retractor 150 has numerous common components to those previously described in reference to belt retractor 58, but that are now arranged to provide "automatic" actuation means for inhibiting withdrawal of safety belts 40 in response to a belt-type harness restraint 152 being secured. Thus, only those components that are new or functionally modified will be discussed hereafter in any detail. In general, linear-type belt retractor 150 has a locking mechanism 154 that is normally operable in the "released" mode for permitting withdrawal and retraction of harness restraint 152 until a belt buckle 156 secured thereon is releasably fastened to a fixed tongue plate 158. As best seen from FIGS. 11 and 12, harness restraint 152 is a conventional three-point arrangement having a T-shaped cushioned shield 160 that is fixed to the first end of safety belts 40, while tongue plate 158 is shown anchored to seat pan 30. However, it is to be understood that the underlying frame structure and harness restraint 152 are merely exemplary of one specific type of belt-type restraint system for which the present invention is readily applicable.

With continued reference to the drawings, tension belt 52 is shown having one end coupled to connector bar 46 and its opposite end coupled to a rearward portion of seat pan 30. According to the particular embodiment shown, linear-type belt retractor 150 is mounted to a rigid mounting bracket 151 which, in turn, is fixed to an underside surface of seat pan 30. As before, linear-type belt retractor 150 is operable for selectively adjusting the "effective" length of tension belt 52 for causing corresponding extension or retraction of safety belts 40 with respect to a child seated in integral child seat 16. More specifically, linear-type belt retractor 150 includes a locking mechanism 154 having an elongated lock plate 62 fixed to seat pan 30 and a latch assembly 64 that is retained for reciprocal longitudinal movement on lock plate 62. Moreover, an intermediate portion of tension belt 52 is slidably retained on latch assembly 64. Thus, linear movement of latch assembly 64 in a first direction (i.e., toward the rear edge of seat pan 30) permits safety belts 40 to be withdrawn from integral child seat 16. Likewise, linear movement of latch assembly 64 in an opposite second direction acts to retract safety belts 40 into integral child seat 16. Biasing means, shown as a rewind spring 162 having a coiled portion supported from bracket 151 and a free end fixed to slide bracket 80, is provided for normally urging latch assembly 64 in the second direction for continuously exerting a retractive force on safety belts 40. Again, since tension belt 52 is "doubled-back" on itself due to its slidable connection to latch assembly 64, a predetermined amount of linear movement of latch assembly 64 results in a change in the effective length of tension belt 52 that has a magnitude equal to twice the predetermined amount.

According to the embodiment shown, locking mechanism 154 is arranged to normally operate in the "released" mode for permitting movement of latch assembly 64 in the first and second direction and, in turn, permitting withdrawal and retraction, respectively, of safety belts 40. To inhibit movement of latch assembly 64 in the first direction, belt retractor 150 further includes an actuation mechanism 164 that is automatically actuated in response to complete insertion of belt buckle 156 over tongue plate 158, thereby placing locking mechanism 154 in the "locked" mode. Accordingly, actuation mechanism 164 is automatically actuated for shifting locking mechanism 154 from the "released" mode to the "locked" mode in response to movement of release plate 102 from a "non-actuated" position to an "actuated" position. In the "non-actuated" position shown in FIGS. 13 and 15, actuation mechanism 164 is operable for maintaining projection 84 of latch member 82 out of locked engagement with locking apertures 74 to permit linear movement of latch assembly 64 in both of the first and second directions. In particular, actuation mechanism 164 functions to resiliently depress latch plate 82 in opposition to the biasing of leaf spring 88 so as to permit rear latch face 86 to slide over teeth 78, thereby maintaining locking mechanism 154 in the normal "released" mode. Moreover, when release plate 102 is in the "non-actuated" position, cam projections 106 are located within locking apertures 74 such that tapered ends 110 thereof extend beyond the plane of teeth 78. As such, rear latch face 86 of projection 84 is not engageable with first tooth edges 92A, thereby permitting sliding longitudinal movement of latch member 82 and, in turn, latch assembly 64 over lock plate 62 in the first direction. As will be appreciated, rewind spring 162 exerts a continuous retractive force on latch assembly 64 for urging "ratcheting" movement thereof in the second direction for retracting safety belts 40.

With particular reference to FIG. 16, movement of release plate 102 to the "actuated" position causes cam projections 106 to move out of locking apertures 74 and into alignment with elongated slot 76 for permitting leaf spring 88 to bias projection 84 on latch member 82 into locked engagement within a locking aperture 74. Thus, any subsequent attempt to withdraw safety belts 40 causes rear latch face 86 of projection 84 to lockingly engage the first set of tooth edges 92A. In this position, locking mechanism 154 is in the "locked" mode such that latch assembly 64 is locked against linear movement in the first direction for inhibiting extension of tension belt 52 and, in turn, extension of safety belts 40. As will be appreciated, locking mechanism 154 is, however, operable in the "locked" mode to permit movement of latch assembly 64 in the second direction for exerting a continuous retractive force on harness restraint 152.

To provide means for automatically moving release plate 102 from the "non-actuated" position to the "actuated" position, actuation mechanism 164 includes a spring-biased cam member 170 that is fixed to release plate 102. Cam member 170 has a tapered end surface 172 located in close proximity to tongue plate 158. A biasing member, shown as a coil spring 174, is disposed between cam member 170 and a stationary seat pan surface for normally biasing cam member 170 and release plate 102 toward the "non-actuated" position of FIG. 15. Accordingly, upon insertion of buckle 156 over tongue plate 158, a curled lip portion 175 of belt buckle 156 acts on cam member 170 for causing longitudinal sliding movement thereof (and release plate 102) in opposition to the biasing of coil spring 174. Once belt buckle 156 is releasably secured to tongue plate 158, release plate 102 is located in the "actuated" position for locking latch assembly 64 against linear movement on lock plate 62 in the first direction. Likewise, release of belt buckle 156 from tongue plate 158 causes release plate 102 to return to the "non-actuated" position. Thus, actuation of actuation mechanism 164 is automatic and dependent on the buckled relationship between belt buckle 156 and tongue plate 158. Finally, it will be noted that linear-type belt retractor 150 could also be mounted in seatback member 28 with a remote linear actuation arrangement (i.e., bowden cable, linkage, etc.) interconnected between cam member 170 and release plate 102.

Figure 17:
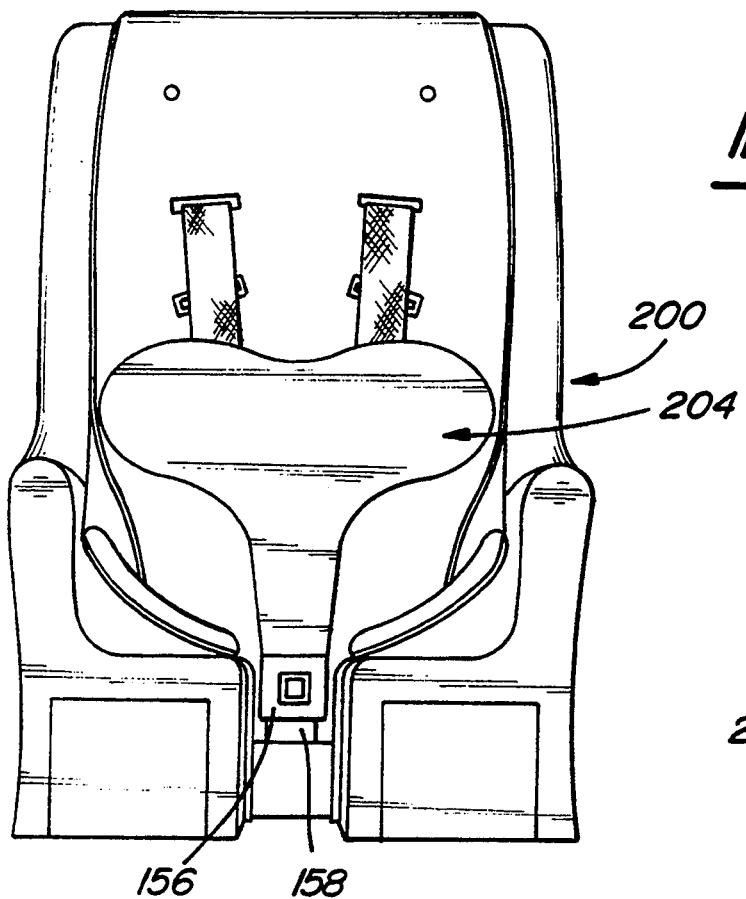
FIG. 17 is a front view of an exemplary auxiliary child seat having the automatic linear-type belt retractor of FIGS. 12 through 16 incorporated therein.
Figure 18:
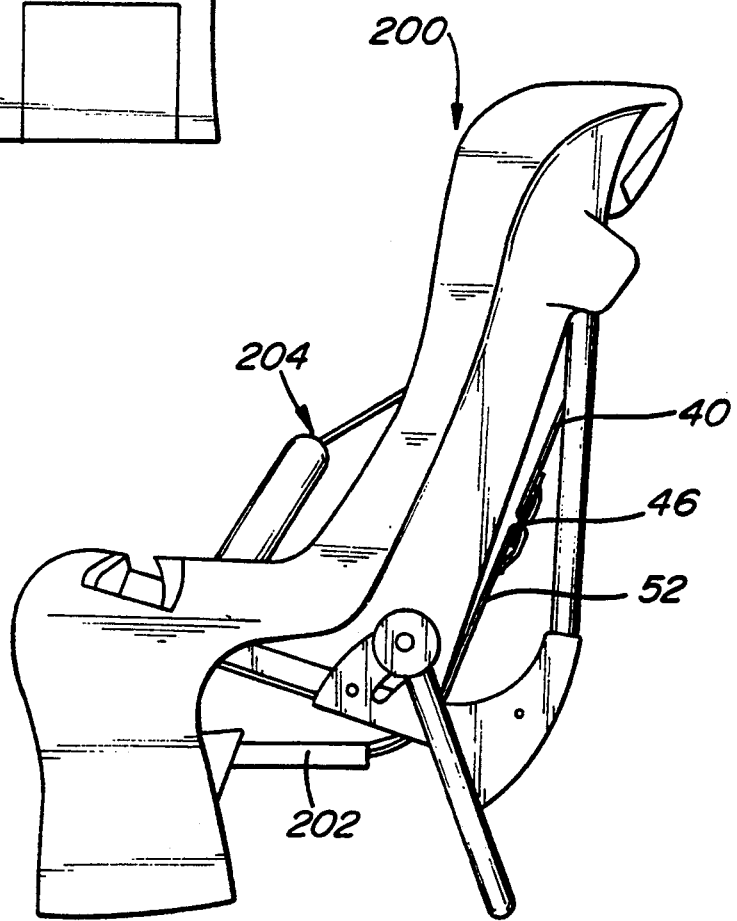
FIG. 18 is a side view of FIG. 17.

For the express purposes of showing alternative vehicular applications for the various embodiments of linear-type belt retractors disclosed herein, FIGS. 17 and 18 illustrate an otherwise conventional auxiliary child seat 200 having a linear-type belt retractor 202 incorporated therein. Auxiliary child seat 200 is also shown to include an exemplary harness restraint 204 that is similar to harness restraint 152. Linear-type belt retractor 202 is shown mounted to an underside seat portion of child seat 200 and is operable for adjusting the effective length of tension belt 52 for causing corresponding extension and retraction of harness restraint 204. According to one construction, linear-type belt retractor 202 is substantially identical to linear-type belt retractor 150 for automatically inhibiting withdrawal of harness restraint 204 upon buckling of belt buckle 156 onto tongue plate 158. In addition, it is contemplated that linear-type belt retractor 200 could also be substantially similar to manually-operable belt retractor 58 having locking mechanism 60 for exerting the continuous retractive force on harness restraint 204 or, alternatively, include locking mechanism 120 for providing the tension relief feature.

While specific embodiments have been shown and described in detail to illustrate the principles of the present invention, it will be understood that the present invention may be embodied otherwise without departing from such principles. For example, one skilled in the art will readily recognize from such discussion and from the accompanying drawings and claims that various changes, modifications and variations can be made therein without departing from the spirit and scope of the invention as defined in the following claims.

What is claimed is:

1. A safety belt retractor comprising:
   a first member;
   a second member supported for longitudinal movement on said first member;
   a safety belt restraint having a belt buckle that is releasably engageable with a tongue plate, and a belt member secured to said second member such that longitudinal movement of said second member in a first direction corresponds to withdrawal of said safety belt restraint and longitudinal movement of said second member in a second direction corresponds to retraction thereof;
   latch means retained on said second member for movement between a first position releasably engaging said first member for inhibiting movement of said second member in said first direction, and a second position displaced from said first member for permitting movement of said second member in both of said first and second directions; and
   actuation means for moving said latch means from said second position to said first position in response to locked engagement of said belt buckle with said tongue plate.

2. The safety belt retractor of claim 1 wherein said actuation means includes a third member that is selectively engageable with said latch means for normally retaining said latch means in said second position when said belt buckle is released from said tongue plate, and wherein said third member is movable out of engagement with said latch means in response to locked engagement of said belt buckle with said tongue plate for permitting said latch means to move to said first position.

3. The safety belt retractor of claim 2 further comprising first biasing means for biasing said latch means toward said first position, and second biasing means for normally biasing said third member into engagement with said latch means for urging said latch means to said second position in opposition to the biasing exerted thereon by said first biasing means.

4. The safety belt retractor of claim 1 wherein said first member is a lock plate having a series of longitudinally aligned locking apertures formed therein, and wherein said latch means includes a latch plate supported from said second member and having a projection formed thereon, said latch plate being movable with respect to said lock plate between said first position wherein said projection is lockingly retained within one of said locking apertures and said second position wherein said projection is displaced from said locking apertures.

5. The safety belt retractor of claim 4 wherein said actuation means includes a release plate that is selectively engageable with said latch plate for normally retaining said latch plate in said second position when said belt buckle is released from engagement with said tongue plate, and wherein said release plate is movable out of engagement with said latch plate in response to locked engagement of said belt buckle with said tongue plate for permitting a biasing means to forcibly urge said latch means to move to said first position.

6. The safety belt retractor of claim 5 wherein said safety belt restraint is adapted to extend over a seat occupant positioned within a seat, and wherein said release plate is supported for movement between a non-actuated position engaging said latch plate and an actuated position displaced from said latch plate, said actuation means further comprising:
- second biasing means for normally biasing said release plate toward said non-actuated position; and
- operator means fixed to said release plate and engageable with said belt buckle for moving said release plate from said non-actuated position to said actuated position in response to releasably locking said belt buckle with said tongue plate.

7. The safety belt retractor of claim 4 wherein said belt member has a first end coupled to said safety belt restraint and a second end fixed to a stationary surface, an intermediate portion of said belt member being slidably retained on said latch assembly such that reciprocal longitudinal movement of said latch assembly corresponds to an increase or decrease in the effective length of said belt member, whereby a predetermined amount of travel of said latch assembly results in a change in the effective length of said belt member having a magnitude equal to twice said predetermined amount of travel.

8. The safety belt retractor of claim 4 herein said lock plate is fixed to a seat portion of a child restraint seat and said belt member is coupled to a harness restraint provided for retaining a child within said child restraint seat.

9. A child restraint seat comprising:
- a seat member and a seatback configured to receive a child therein;
- a belt-type harness that extends over the child and has an interlocking belt buckle and tongue plate mounted to said child restraint seat and said harness; and
- retractor means mounted to one of said seat member and seatback and having a stationary first member, a second member coupled to a belt member of said harness and supported for reciprocal longitudinal movement on said first member, said second member being movable in a first direction to permit withdrawal of said harness and in a second direction for permitting retraction of said harness, said retractor means further including latch means retained on said second member for movement between a first position releasably engaging said first member for inhibiting movement of said second member in said first direction and a second position displaced from said first member for permitting movement of said second member in both of said first and second directions, and actuation means for moving said latch means from said second position to said first position in response to locked engagement of said belt buckle with said tongue plate.

10. The child seat of claim 9 wherein said actuation means includes a third member that is selectively engageable with said latch means for normally retaining said latch means in said second position when said belt buckle is released from said tongue plate, and wherein said third member is movable out of engagement with said latch means in response to locked engagement of said belt buckle with said tongue plate for permitting said latch means to move to said first position.

11. The child seat of claim 10 further comprising first biasing means for normally biasing said latch means toward said first position, and second biasing means for normally biasing said third member into engagement with said latch means for urging said latch means to said second position in opposition to the biasing exerted thereon by said first biasing means.

12. The child seat of claim 9 wherein said first member is a lock plate having a series of longitudinally aligned locking apertures formed therein, and wherein said latch means includes a latch plate supported from said second member and having a projection formed thereon, said latch plate being movable with respect to said lock plate between said first position wherein said projection is lockingly retained within one of said locking apertures and said second position wherein said projection is displaced from said locking apertures, and further comprising first biasing means operable for normally biasing said projection on said latch plate toward said locking apertures.

13. The child seat of claim 12 wherein said actuation means includes a release plate that is selectively engageable with said latch plate for normally retaining said latch plate in said second position when said belt buckle is released from engagement with said tongue plate, and wherein said release plate is movable out of engagement with said latch plate in response to locked engagement of said belt buckle with said tongue plate for permitting said biasing means to urge said latch plate to said first position.

14. The child seat of claim 13 wherein said release plate is supported for movement between a non-actuated position engaging said latch plate and an actuated position displaced from said latch plate, said actuation means further comprising:
- second biasing means for normally biasing said release plate toward said non-actuated position; and
- operator means fixed to said release plate and engageable with said belt buckle for moving said release plate from said non-actuated position to said actuated position in response to releasably locking said belt buckle with said tongue plate.

15. The child seat of claim 12 wherein said belt member has a first end coupled to said belt-type harness and a second end fixed to a stationary surface, an intermediate portion of said belt member being slidably retained on said latch assembly such that reciprocal longitudinal movement of said latch assembly corresponds to an increase or decrease in the effective length of said belt member, whereby a predetermined amount of travel of said latch assembly results in a change in the effective length of said belt member having a magnitude equal to twice said predetermined amount of travel.

16. The child seat of claim 9 wherein said child restraint seat is an auxiliary child seat of the type mountable upon an existing seat unit.

17. The child seat of claim 9 wherein said child restraint seat is an integral child seat that is convertible from a positioned stored in a backrest portion of an existing seat unit to a deployed position for exposing said seat member and said seatback.

18. A seating arrangement for accommodating an adult in a seated position and having an integral child seat convertible from a position stored within a backrest member to a deployed position for accommodating a child, comprising:
- said integral child seat having a seat member, a seatback and a belt-type harness restraint that extends over the child and has an interlocking belt buckle and tongue plate mounted to said integral child seat and said harness restraint; and
- retractor means mounted to one of said seat member and seatback and having a stationary first member, a second member coupled to a belt member of said harness and supported for reciprocal longitudinal movement relative to said first member, said second member being movable in a first direction to permit withdrawal of said harness restraint and in a second direction for permitting retraction of said harness restraint, said retractor means further including latch means retained on said second member for movement between a first position releasably engaging said first member for inhibiting movement of said second member in said first direction and a second position displaced from said first member for permitting movement of said second member in both of said first and second directions, and actuation means for moving said latch means from said second position to said first position in response to locked engagement of said belt buckle with said tongue plate.

19. The seating arrangement of claim 18 wherein said actuation means includes a third member that is selectively engageable with said latch means for normally retaining said latch means in said second position when said belt buckle is released from said tongue plate, and wherein said third member is movable out of engagement with said latch means in response to locked engagement of said belt buckle with said tongue plate for permitting said latch means to move to said first position.

20. The seating arrangement of claim 19 further comprising first biasing means for normally biasing said latch means toward said first position, and second biasing means for normally biasing said third member into engagement with said latch means for urging said latch means to said second position in opposition to the biasing exerted thereon by said first biasing means.

21. The seating arrangement of claim 18 wherein said first member is a lock plate having a series of longitudinally aligned locking apertures formed therein, and wherein said latch means includes a spring-biased latch plate supported from said second member and having a projection formed thereon, said latch plate being movable with respect to said lock plate between said first position wherein said projection is lockingly retained within one of said locking aperture for defining a locked mode and said second position wherein said projection is displaced from said locking apertures for defining a released mode, said latch means further including first biasing means for normally biasing said projection on said latch plate toward said locking apertures.

22. The seating arrangement of claim 21 wherein said actuation means includes a release plate that is selectively engageable with said latch plate for normally retaining said latch plate in said second position when said belt buckle is release from engagement with said tongue plate, and wherein said release plate is movable out of engagement with said latch plate in response to locked engagement of said belt buckle with said tongue plate for permitting said biasing means to urge said latch plate to said first position.

23. The seating arrangement of claim 22 wherein said release plate is supported for movement between a non-actuated position engaging said latch plate and an actuated position displaced therefrom, said actuation means further comprising:
second biasing means for normally biasing said release plate toward said non-actuated position; and
operator means fixed to said release plate and engageable with said belt buckle for moving said release plate from non-actuated position to said actuated position in response to locking said belt buckle with said tongue plate.

24. The seating arrangement of claim 21 wherein said belt member has a first end coupled to said harness restraint and a second end fixed to a stationary surface, an intermediate portion of said belt member being slidably retained on said latch assembly such that reciprocal longitudinal movement of said latch assembly corresponds to an increase or decrease in the effective length of said belt member, whereby a predetermined amount of travel of said latch assembly results in a change in the effective length of said belt member having a magnitude equal to twice said predetermined amount of travel.

25. A linear-type belt retractor for use with a safety belt restraint comprising:
a frame member;
an elongated lock plate fixed to said frame member;
a latch assembly supported for reciprocal longitudinal movement on said lock plate;
a safety belt restraint having a belt buckle that is releasably engageable with a tongue plate, and a belt member having a first end fixed to the safety belt restraint, a second end fixed to said frame member, and an intermediate portion slidably secured to said latch assembly such that movement of said latch assembly in a first direction permits withdrawal of the safety belt restraint and movement in a second direction permits retraction of the safety belt restraint;
a latch member retained on said latch assembly for movement between a first position lockingly engaging said lock plate to inhibit movement of said latch assembly in said first direction and a second position displaced from said lock plate for permitting movement of said latch assembly in both of said first and second directions;
first biasing means for normally urging said latch member toward said first position; and
actuation means for moving said latch member from said second position to said first position in response to locked engagement of said belt buckle with said tongue plate.

26. The linear-type belt retractor of claim 25 wherein said safety belt restraint is adapted to extend over a seat occupant positioned within a seat and having said belt buckle and said tongue plate mounted to said safety belt restraint and said seat, and wherein said actuation means comprises:
a release plate supported for movement between a non-actuated position wherein said release plate acts on said latch member for retaining said latch member in said second position and an actuated position displaced from said latch member wherein said latch member is permitted to move to said first position;
second biasing means for normally biasing said release plate toward said non-actuated position; and
cam means fixed to said release plate and engageable with said belt buckle for moving said release plate from said non-actuated position to said actuated position in response to insertion of said belt buckle onto said tongue plate, whereby said release plate is disengaged from said latch member for permitting said latch plate to move to said first position.

27. The linear-type belt retractor of claim 26 wherein said frame member is associated with one of a seat portion and a seatback portion of a child restraint seat and said belt member is coupled to a harness restraint.

28. The linear-type belt retractor of claim 27 wherein said child restraint seat is an integral fold-out child seat incorporated into a backrest of a seating unit.

29. The safety belt retractor of claim 1 further comprising a rewind spring for normally biasing said second member for movement in said second direction.

30. The safety belt retractor of claim 3 further comprising a rewind spring for normally biasing said second member for movement in said second direction.

31. The safety belt retractor of claim 6 further comprising a rewind spring for normally biasing said second member for movement in said second direction so as to exert a retractive load on said safety belt restraint.

32. The child seat of claim 9 further comprising a rewind spring for normally biasing said second member for movement in said second direction.

33. The child seat of claim 11 further comprising a rewind spring for normally biasing said second member for movement in said second direction, 34. The child seat of claim 14 further comprising a rewind spring for normally biasing said second member for movement in said second direction so as to exert a retractive load on said safety belt restraint.

35. The seating arrangement of claim 18 further comprising a rewind spring for normally biasing said second member for movement in said second direction.

36. The seating arrangement of claim 20 further comprising a rewind spring for normally biasing said second member for movement in said second direction.

37. The seating arrangement of claim 23 further comprising a rewind spring for normally biasing said second member for movement in said second direction so as to exert a retractive load on said safety belt restraint.

38. The linear-type belt retractor of claim 25 further comprising a rewind spring for normally biasing said latch assembly for movement in said second direction.

39. The belt retractor of claim 26 further comprising a rewind spring for normally biasing said latch assembly for movement in said second direction so as to exert a retractive load on said safety belt restraint.

40. A safety belt restraint system for a child seat comprising:

a safety belt having a first fastener attached thereto;

a retractor coupled to said safety belt and operable in a released mode for permitting said safety belt to be controllably withdrawn and retracted and in a locked mode for inhibiting withdrawal of said safety belt, said retractor including first means movable between a first position for placing said retractor in said locked mode and a second position for placing said retractor in said released mode;

a second fastener attached to the child seat which is releasably engageable with said first fastener; and second means movable from a non-actuated position to an actuated position in response to locked engagement of said first fastener with said second fastener, said second means acting on said first means such that movement of said second means to said actuated position causes movement of said first means to said first position for automatically shifting said retractor into said locked mode.

41. The safety belt restraint system of claim 40 wherein upon release of said first fastener from locked engagement with said second fastener, said second means moves from said actuated position to said non-actuated position for permitting movement of said first means from said first position to said second position so as to automatically shift said retractor from said locked mode into said released mode.

42. The safety belt restraint system of claim 41 further comprising first biasing means for normally biasing said first means toward said first position, and second biasing means for normally biasing said second means toward said non-actuated position, whereby in said non-actuated position said second means acts on said first means for retaining said first means in said second position in opposition to the biasing exerted thereon by said first biasing means.

43. The safety belt restraint system of claim 41 further comprising cam means fixed to said second means and engageable with said first fastener upon engagement thereof with said second fastener for moving said second means from said non-actuated position to said actuated position.

* * * * *